May 9, 1961 F. P. BALDWIN ET AL 2,983,705
STABILIZING CHLORINATED RUBBERY POLYMERS
Filed Oct. 29, 1956 2 Sheets-Sheet 1

Francis P. Baldwin
Robert M. Thomas   Inventors
Irving Kuntz
By *W. H. Smyers* Attorney May 9, 1961　　　F. P. BALDWIN ET AL　　　2,983,705
STABILIZING CHLORINATED RUBBERY POLYMERS
Filed Oct. 29, 1956　　　　　　　　　　　　　2 Sheets-Sheet 2

Francis P. Baldwin
Robert M. Thomas　　Inventors
Irving Kuntz

By　*W. H. Smyers*　Attorney

United States Patent Office 2,983,705
Patented May 9, 1961

2,983,705
STABILIZING CHLORINATED RUBBERY POLYMERS

Francis P. Baldwin, Colonia, Robert M. Thomas, Westfield, and Irving Kuntz, Roselle Park, N.J., assignors to Esso Research and Engineering Company, a corporation of Delaware Filed Oct. 29, 1956, Ser. No. 618,796

6 Claims. (Cl. 260—45.8)

This invention relates to rubbery polymeric compositions containing partially chlorinated copolymers of isoolefins and multiolefins, particularly chlorinated butyl rubber, and to the stabilization of such compositions. It also relates to compositions containing partially chlorinated (hereinafter referred to as chlorinated) copolymers of isoolefins and multiolefins together with minor proportions of certain organic aromatic or heterocyclic stabilizers.

The invention will be best understood from the following description read in connection with the accompanying drawings wherein.

Figure 4:
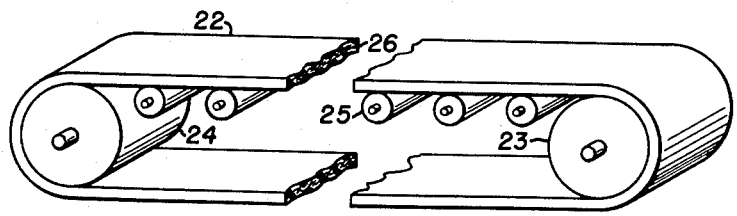
Figure 5:
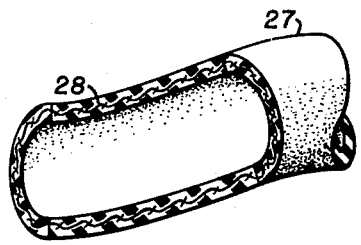

Figure 4 is a generally edgewise perspective view of a conveyor belt structure in which the belt is formed of a stabilized, chlorinated copolymer material in accordance with the present invention; and Figure 5 is a perspective view, partly in section, of a portion of a typical steam hose formed of a composition comprising a stabilized, chlorinated copolymer in accordance with the present invention.

Copolymers of the general type hereinbefore mentioned, which are desirably chlorinated and stabilized with aromatic or heterocyclic compounds in accordance with the invention, especially where the copolymer comprises a major proportion (preferably about 85 to 99.5%) of a $C_4$ to $C_8$ isoolefin such as isobutylene, 2-methyl-butene-1 or 3-methyl butene-1, etc., with a minor proportion (preferably about 15 to 0.5 wt. percent) of a multiolefin of about 4 to 14, preferably about 4 to 6 carbon atoms, are commonly referred to in patents and technical literature as "butyl rubber," or GR–I rubber (Government Rubber-Isobutylene), for example in textbook "Synthetic Rubber" by G. S. Whitby. The preparation of butyl rubber is also described in U.S. Patent 2,356,128 to Thomas et al. and in U.S. application Serial No. 512,182, filed May 31, 1955 to Baldwin et al. The multiolefinic component of the copolymer is preferably a conjugated diolefin such as isoprene, butadiene, dimethylbutadiene, piperylene, or such multiolefins as cyclopentadiene, cyclohexadienes, dimethallyl, allo-ocymene, vinyl fulvenes, etc. The copolymer comprising isobutylene and isoprene is preferred, although the copolymer may contain about 0.05 to 20.0, preferably about 0.2 to 5.0, parts by weight based on total reacting comonomers of such monoolefinic compounds as styrene, p-methyl styrene, alpha methyl styrene, indene, dihydronaphthalene, dichlorostyrene, p-chlorostyrene, mixtures thereof, etc.

Other copolymers which are desirably chlorinated and stabilized in accordance with the present invention include copolymers of 4-methyl-pentene-1, 2-ethyl butene-1, 4-ethyl pentene-1, or the like, as well as isobutylene or 3-methyl butene-1 with the following multiolefins:

(1) acyclic or open-chain conjugated diolefins such as 3-methyl pentadiene-1,3; hexadienes; 2-neopentyl-butadiene-1,3; and the like;

(2) alicyclic diolefins, both conjugated and non-conjugated such as 1-vinyl cyclohexane-3, 1-vinyl cyclobutene-2, cyclopentadiene, dicyclopentadiene, diolefinic terpenes such as dipentene, terpinenes, terpinoline, phellandrenes, sylvestrene and the like;

(3) acyclic triolefins such as 2,6-dimethyl-4-methylene-heptadiene-2,5; 2-methyl hexatriene-1,3,5 and other conjugated triolefins such as ocimene;

(4) alicyclic triolefins such as fulvene; 6-6-dimethyl fulvene; 6-phenyl fulvene; tertiary alkyl fulvenes; 1,3,3-trimethyl-6-vinylcyclohexadiene-2; cycloheptatriene, etc., and;

(5) higher multiolefins such as 6,6-vinyl methyl fulvene (a tetraolefin) and 6,6-diisopropenyl fulvene (a pentaolefin) or the like.

In accordance with the present invention, it has now been found that while vulcanizates of isoolefin-multiolefin copolymers such as butyl rubber do not respond to stabilization by certain aromatic or heterocyclic stabilizing compounds, vulcanizates of the chlorinated derivatives of these copolymers are surprisingly improved by these stabilizing compounds as to resistance to oxidative degradation and as to heat aging resistance, particularly of the zinc oxide and/or primary or polyfunctional amine-cured vulcanizates or covulcanizates.

The chlorinated, rubbery isoolefin-multiolefin-containing copolymers, particularly chlorinated butyl rubbers, which are advantageously stabilized by aromatic or heterocyclic compounds in accordance with the present invention are derived from the foregoing isoolefin-multiolefin hydrocarbon copolymers. They are produced by carefully chlorinating these copolymers in a manner which does not degrade the molecular weight thereof, as more fully described hereinafter. The resulting chlorinated copolymers do not require sulfur or ultra-accelerators in their vulcanization and may be vulcanized solely by zinc oxide and/or primary or polyfunctional amines. The vulcanizates and covulcanizates with other rubbery polymers such as natural and GR–S rubbers formed have been found to exhibit good stress-strain properties and to have superior heat aging resistance compared to the corresponding unchlorinated copolymers. Since these chlorinated copolymers already possess heat aging resistance superior to the unchlorinated copolymers, and the unchlorinated copolymers are not improved as to heat aging resistance by the addition thereto of aromatic and heterocyclic compounds hereinafter more fully described, it is most unexpected that such aromatic or heterocyclic compounds have now been found to even further improve the heat aging resistance of the chlorinated copolymers.

Suitable processes for chlorinating isoolefin-multiolefin containing copolymers are disclosed and claimed in copending application, Serial No. 512,182. In accordance with the disclosure of this last-mentioned application, butyl rubber or similar more highly unsaturated copolymers or tripolymers are chlorinated so as to contain about at least 0.5 wt. percent (preferably at least about 1.0 wt. percent) combined chlorine but not more than about X wt. percent combined chlorine wherein:

$$X = \frac{35.46 L}{(100-L)M_1 + L(M_2 + 35.46)} \times 100$$

and $L$ = mole percent of the multiolefin in the polymer.
$M_1$ = molecular weight of the isoolefin,
$M_2$ = molecular weight of the multiolefin,
35.46 = atomic weight of chlorine.

Suitable chlorinating agents which may be employed are gaseous chlorine, alkali metal hypochlorites, $C_4$ to $C_{10}$ tertiary alkyl hypochlorites, sulfur chlorides, pyridinium chloride perchloride, N-chlorosuccinimide, alpha-chloro-aceto-acetanilide, N,N'-dichloro-5,5 dimethylhydantoin, trichlorophenol chloride, N-chloroacetamide, beta-chloromethyl phthalimide, etc. The preferred chlorinating agents are gaseous chlorine, sulfuryl chloride, chloro-hydantoins, and related materials.

The chlorination is generally conducted at temperatures above about 0° to about +100° C., depending upon the particular chlorinating agent, for about one minute to several hours. An advantageous pressure range is from about 0.1 to 1000 p.s.i.a., atmospheric pressure being satisfactory. The chlorination may be accomplished by preparing 1 to 50 or 80 wt. percent solutions of such copolymers as above, in a substantially inert liquid organic solvent such as a $C_3$ to $C_8$ substantially inert hydrocarbon or halogenated derivatives of saturated hydrocarbons; e.g., hexane, mineral spirits, cyclohexane, benzene, chlorobenzene, chloroform, carbon tetrachloride, mixtures thereof, etc., and adding thereto the chlorinating agent, which may optionally be in solution, such as dissolved in a substantially inert hydrocarbon, an alkyl chloride, carbon tetrachloride, carbon disulfide, etc. If chlorine gas is employed, it may also be diluted with up to about 50 times its volume, preferably about 0.1 to 5.0 times its volume of a substantially inert gas such as nitrogen, methane, carbon dioxide, etc.

The resulting chlorinated isoolefin-multiolefin-containing copolymer, particularly chlorinated butyl rubber polymer, may be recovered by precipitation with oxygenated hydrocarbons, particularly alcohols or ketones such as acetone or any other known non-solvent for the rubber and dried under about 1 to 760 millimeters or higher of mercury pressure absolute at about 0° to 180° C., preferably about 50° to 150° C. (e.g. 70° C.). Other methods of recovering the chlorinated polymer are by conventional spray or drum drying techniques. Alternatively, the solution of the chlorinated rubber may be injected into a vessel containing steam and/or agitated water heated to a temperature sufficient to volatilize the solvent and from an aqueous slurry of the chlorinated rubber. This chlorinated rubber may then be separated from this slurry by filtration and drying or recovered as a "crumb" or as a dense sheet or slab by conventional hot milling and/or extruding procedures.

As so produced, the chlorinated rubbery polymer has a Staudinger molecular weight within the range between approximately 15,000 to 200,000, preferably about 25,000 to 100,000; a Wijs' iodine number between about 0.5 to 50, preferably about 5 to 15; and a mole percent unsaturation between about 0.1 to 30, preferably about 0.2 to 20.0. This copolymer, when cured, has a good elastic limit, tensile strength, abrasion resistance and flexure resistance and may be employed as an inner lining, tie ply, tread base, tread or sidewall in tires; in tire curing bags or bladders, in rubber belting, in steam hose, as electrical insulation, etc.

In practicing the present invention, the resulting unvulcanized chlorinated isoolefin-multiolefin-containing copolymer, prior to curing, is blended at a temperature between about 0° and 200° C. with about 0.05 to 20, advantageously about 0.1 to 10.0, preferably 0.5 to 5.0 wt. percent of one or more of the organic aromatic or heterocyclic stabilizing compounds enumerated hereinafter. This may be accomplished in several manners. In a preferred embodiment of the invention, about ⅛ to ⅞ of the organic stabilizing compound required is blended with the unvulcanized chlorinated copolymer slurry when the copolymer is recovered (i.e., precipitated and/or injected into a hot aqueous medium) but prior to the drying, milling and/or extruding steps. In another preferred embodiment, about ¼ to ¾ of the organic stabilizing compound required is added to the chlorinated copolymer solution prior to recovering the copolymer by spray drying and/or drum drying and/or precipitation and/or injection into a hot aqueous medium. Alternatively, a sufficient portion of the organic compound may be added at any of the stages in processing hereinbefore mentioned that additional stabilizer need not be blended with the dry copolymer on a rubber mill (or similar mixing means such as a Banbury mixer) prior to vulcanization.

It is less preferred to add all of the organic stabilizing compound or compounds on the mill or Banbury just prior to vulcanization. More particularly, it is especially desirable to blend with the chlorinated copolymer at least 0.1 parts, per hundred parts of copolymer, of at least one of the organic stabilizing compounds prior to such finishing operations as spray drying, drum drying, hot milling, extruding or calendering since the organic stabilizing compound substantially prevents degradation or breakdown of the chlorinated copolymer during these operations.

The organic stabilizing compounds employed in accordance with the present invention may have boiling points between about 100° and 700° C. and are chosen from the category enumerated hereinafter, the members of which may be used singly or in combination:

(I) Aromatic or heterocylic compounds containing at least one (preferably 1 to 5) hydroxyl radical and at least one (preferably 1 to 8) substituent selected from the group consisting of alkyl, alkaryl, aryl, aralkyl, cycloalkyl, alkoxy, aryloxy, aroyl, acyl or acyloxy and mixtures thereof, said substituent containing between about 1 and 24, preferably 1 to 18 carbon atoms. The total number of carbon atoms present in such compounds is generally between about 7 and 60, advantageously 7 to 48, preferably 8 to 42. Typical compounds falling within this category include 2,6-ditertiary butyl-4-methyl phenol; 2,2'-methylene-bis (4-methyl-6-tertiary butyl phenol); p-phenylphenol; p-hydroxyl-N-phenyl morpholine; hydroquinone monobenzyl ether; etc.

The foregoing compositions comprising chlorinated isoolefin-multiolefin-containing copolymers and organic stabilizing compounds may be hot-milled, extruded, calendered or dried with facility, in accordance with conventional practice, without thermal degradation. One hundred parts by weight of these resulting compositions are then advantageously compounded with about 10 to 150 parts by weight of a filler or fillers; about 1 to 30 parts by weight of zinc oxide and/or primary or polyfunctional amines; plasticizers such as hydrocarbon oils, tars, waxes, resins or organic esters; pigments; magnesium oxide and/or calcium oxides; with, in certain instances, the addition of quinone dioxime or its derivatives or homologues; dinitroso aromatic compounds such as p-dinitroso benzene or m-dinitroso benzaldehyde; and non-ultra type accelerators such as mercapto-benzothiazole, benzothiazyl disulfide, etc. The compounded stock formed may then be vulcanized at temperatures between about room temperature and 450° F., preferably about 250° to 400° F., for times between about a few seconds to several days, depending upon the particular curatives used, the nature of the isoolefin-multiolefin copolymer, whether other rubbery polymers are being covulcanized therewith, the intended use of the vulcanizate or covulcanizate, etc. In general, the higher the vulcanization temperature, the shorter may be the curing time and vice versa.

It is a further discovery of the present invention that when stabilized, chlorinated isoolefin-multiolefin copolymers (particularly chlorinated butyl rubbers, stabilized in accordance with the invention) are cured by zinc oxide and/or primary or polyfunctional amines in the substantial absence of added elemental sulfur and sulfur-containing ultra-accelerators such as derivatives of thiuram or carbamic acids, but in the presence of minor proportions of resinous polymerized hydroxy aromatic (or heterocyclic) dialcohol compounds, particularly about 0.1 to 20, preferably about 0.5 to 10.0 weight percent of dimethylol phenolic resins, stabilized vulcanizates are produced which surprisingly exhibit not only resistance to thermal deterioration but also a combination of unusually high resistance to flexure and fatigue. The foregoing dialcohol resins are produced by heating the monomeric phenol dialcohol at temperatures of between about 75° and 175° C.; (e.g., 125° C.), care being taken to terminate the reaction while the resin is in the soluble (i.e., in organic solvents) and fusible state. Vulcanizates or convulcanizates of this last-mentioned type are especially useful in tires (especially in the carcass, undertread and bead areas), in tire casing curing bags or diaphragms, and in steam hose or similar articles. The vulcanization conditions for such compositions are generally as hereinbefore and hereinafter mentioned.

One particularly useful formulation for compounding the unvulcanized stabilized chlorinated isoolefin-multiolefin-containing copolymer, particularly chlorinated butyl rubber, for use in tie plys, carcass construction or tubeless tire inner linings, is as follows or the equivalent. It will be noted that the formulation may be free of added elemental sulfur and sulfur-containing ultra-type-accelerators (i.e., derivatives of thiuram and carbamic acids).

| Component | Parts by Weight | |
|---|---|---|
| | Typical Range | Preferred Range |
| Chlorinated Butyl Rubber | 100 | 100 |
| Tackifier (e.g. phenolic-aldehyde resin) | 0-40 | 1-15 |
| Hydrated silica (e.g. Hi-Sil-202)[1] | 0-100 | 10-75 |
| Plasticizer Oil [2] | 0-50 | 5-35 |
| Stabilizer | 0.05-20.0 | 0.1-5.0 |
| Carbon Black (e.g., MPC Black) | 0-150 | 10-75 |
| Accelerator (e.g., benzothiazyl disulfide) | 0-10.0 | 0-5.0 |
| Diamine Curing Agent (e.g., hexamethylene diamine) | 0-20 | 1-10 |
| Basic Metal Compound (e.g., zinc oxide) | 0-50.0 | 1.0-30.0 |
| Phenol dialcohol resin (e.g., 2-6-dimethylol-4-octyl phenol resin) | 0-20.0 | 0.1-15.0 |

[1] Hi-Sil-202 is a pigment of very fine particle size of precipitated hydrated silica having the properties listed below:

| Property: | Value |
|---|---|
| Bulk density (lbs. per cubic foot) | 8.0 |
| Specific gravity | 1.95 |
| Average particle size (millimicrons) | 22 |
| Moisture (%) | 5 |
| pH | 7.5 |
| Refractive index | 1.46 |
| Ignition loss (% max.) | 10 |
| SiO$_2$ (%) | 84 |
| CaO (%) | 1.0 |
| NaCl (% max.) | 1.0 |
| Fe$_2$O$_3$ (% max.) | 0.3 |
| Al$_2$O$_3$ (% max.) | 4.0 |

[2] The plasticizer oil is preferably a hydrocarbon oil derived from a paraffinic or naphthenic base crude having the following characteristics:

| Property | Preferred Range | Typical Range |
|---|---|---|
| Specific Gravity | 0.7-1.0 | 0.85-0.97 |
| Flash Point, ° F. (open cup method) | 350-600 | 400-550 |
| Viscosity, SSU: | | |
| @ 100° F. | 200-1,500 | 300-1,000 |
| @ 210° F. | 10-400 | 30-200 |
| Iodine Number (cg./g.) | 0-40 | 0-20 |

The uncured, chlorinated butyl rubber may also be blended with about 0.5 to 10%, of a group II metal silicate, particularly calcium silicate, and/or with about 1 to 5% of an adsorbent deactivator such as various high boiling polar compounds, e.g., ethylene glycol, during or preferably before the rubber is compounded with the hydrated silica and curatives.

The amount of hydrated silica added, per 100 parts by weight of chlorinated butyl rubber is generally about 10 to 75, preferably about 20 to 40 parts by weight for the tie ply compositions, and somewhat higher, say about 20–100, preferably about 30–75 parts for compositions suitable for inner linings of tires. To the compound containing about 10 to 100 parts by weight of hydrated silica, may also be blended about 20 to 80 parts of a carbon black, preferably a thermal black for inner lining compositions or a channel black (or thermal black) for tie ply compositions. For inner lining compositions, about 0 to 200, preferably about 50 to 150 parts by weight of mineral filler may be desirably employed. Such fillers include diatomaceous earth, montmorillonites, hard clays, soft clays, talc, lithopone, barytes, or alumina, etc.

Vulcanization of such compositions as the foregoing, when used in tie plies is generally for about 1 to 200 minutes at temperatures in the range of between about 250° to 400° F., preferably about 270° to about 380° F.

A typical compounded base stock for use as a pastel or white sidewall in tires would include the following or its equivalent.

| Component | Parts by Weight | |
|---|---|---|
| | Typical Range | Preferred Range |
| Chlorinated butyl rubber | 100 | 100 |
| Quinone dioxime | 0-1.5 | 0-0.8 |
| Phenol dialcohol resin (e.g., 2,6-dimethylol-4-tertiary butyl phenol resin) | 0-20.0 | 0.1-10.0 |
| TiO$_2$ | 10-100 | 20-75 |
| ZnO | 2-40 | 3-30 |
| MgO and/or CaO | 0-50 | 10-40 |
| Bluing Agent (Ultramarine Blue) | 0-3.0 | 0.3-1.5 |
| Stearic Acid | 0-3.0 | 0.3-1.5 |
| Clays and/or Silicas | 0-50 | 10-30 |
| Accelerator (e.g., benzothiazyl disulfide) | 0-10 | 0-5.0 |
| Stabilizer | 0.05-20.0 | 0.1-5.0 |
| Amine (e.g., n-decylamine) (Curative) | 0-5.0 | 0.05-2.0 |

Suitable pigments, when employed in minor quantities (e.g., 0.1 to 30 parts by weight per 100 parts of total rubber) in pastel butyl rubber composites, are as follows: ferric hydroxide; chrome-yellow; Prussian blue, phthalocyanine; etc. Non-staining stabilizers, in accordance with the invention, or even a slightly colored stabilizer such as phenyl beta naphthylamine, may be employed. The non-staining stabilizers which are particularly efficacious for white butyl vulcanizates comprise about 0.1 to 5.0 weight percent, based on total rubbery polymer of the organic stabilizing compounds of categories I, III, or IV, such as alkylated phenols including 2,6-ditertiary butyl-4-methyl phenol; bisphenols such as bis (2-hydroxy-3-tertiary butyl-5-methyl phenyl) methane, or 2,2'-methylene-bis-(4-methyl 6-tertiary butyl) phenol, and amino phenols such as N-lauroyl p-amino phenol.

In order to more fully illustrate the present invention, the following experimental data are given.

CHLORINATED BUTYL RUBBER "A"

A copolymer of about 97% isobutylene and 3% isoprene having a viscosity average molecular weight of 320,000 was dissolved in hexane to form a 10% solution. To this polymer solution, a 20 weight percent (based on the polymer) of liquid sulfuryl chloride as the chlorinating agent was added at room temperature. The resulting chlorinated interpolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

CHLORINATED RUBBERS "B" TO "L"

Eleven additional runs are made chlorinating isoolefin-multiolefin copolymers. The amount of isoolefin and multiolefin in copolymer, chlorination agent, and amount of chlorine combined in the copolymer are tabulated hereinafter. The recovery procedure is the same as for chlorinated butyl rubber "A." In each instance, when 100 parts by weight of the chlorinated copolymer formed is blended with 5 parts by weight of zinc oxide and 40 parts by weight of MPC carbon black and then cured for 40 minutes at 300° F., each resulting vulcanizate has a tensile strength in excess of 1,000 p.s.i. The molecular weight of each copolymer is also not substantially degraded. The data is as follows:

| Chlorinated Rubber | Isoolefin Percent [1] | Multiolefin Percent [1] | Chlorination Agent | Percent Cl in the Rubber [1] |
|---|---|---|---|---|
| B | Isobutylene (98) | Isoprene (2) | $SO_2Cl_2$ | 1.2 |
| C | Isobutylene (97.5) | Isoprene (2.5) | $Cl_2$ in $CCl_4$ | 1.4 |
| D | Isobutylene (95) | Isoprene (5.0) | $Cl_2$ in $CCl_4$ | 2.5 |
| E | Isobutylene (94) | Cyclopentadiene (6) | $Cl_2$ in $CCl_4$ | 2.0 |
| F | Isobutylene (92) | Myrcene (8.0) | $Cl_2$ in $CCl_4$ | 1.6 |
| G | 2-methylbutene-1 (95) | Isoprene (5) | $Cl_2$ in $CCl_4$ | 1.3 |
| H | 3-methylbutene-1 (96) | Butadiene (4) | $Cl_2$ in $CCl_4$ | 1.7 |
| I | Isobutylene (98) | 1-vinyl cyclohexene-3 | $Cl_2$ in $CCl_4$ | 0.8 |
| J | Isobutylene (92) | Butadiene (8) | $Cl_2$ in $CCl_4$ | 2.4 |
| K | Isobutylene (85) | Isoprene (15) | $Cl_2$ in $CCl_4$ | 6.0 |
| L | Isobutylene (98) | Isoprene (2) | N-N'-dichloro-5,5-dimethyl hydantoin. | 1.1 |

[1] Note.—percent in all instances is percent by weight.

Examples I–II

Three additional runs were made chlorinating butyl rubber. The butyl rubber employed in all instances was a commercial butyl rubber corresponding to GR–I–18 rubber. Such a rubber is produced by employing in the polymerization feed about 2.5 weight percent isoprene and about 97.5% isobutylene. The rubber had an eight minute Mooney viscosity at 212° F. of 71.0, a mole percent unsaturation of 1.47, and a viscosity average molecular weight of 420,000.

The chlorination of solutions of the above uncured butyl rubber was conducted in a 50-gallon glass-lined Pfaudler reactor equipped with agitator and baffle.

The solvent for the butyl rubber was as follows:

| Component | Volume percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-Hexane | 44.85 |
| Methyl cyclopentane | 20.5 |
| 2,2-dimethyl pentane | 0.4 |
| Benzene | 7.7 |
| Cyclohexane | 0.85 |

Gaseous chlorine was continuously added to the butyl solutions over a period of 10 minutes at 30° C. and under atmospheric pressure. The chlorine was added to the reactor through a 3/8-inch stainless steel tube, one end of which was immersed below the liquid level of the agitated butyl rubber solutions. The agitated solutions were then allowed to stand for an additional 50 minutes. The resulting solutions of chlorinated butyl rubber were then water-washed three times to remove dissolved hydrogen chloride. There was then added 0.2 pound of a stabilizer (2,6-di-tertiary butyl-4-methyl phenol) per 100 pounds of the polymer in accordance with the invention. The solutions were then filtered to remove impurities as a precautionary measure.

The absolute amounts of butyl rubber, solvent and chlorine added as well as the calculated percent of added chlorine based on polymer and resulting percent of chlorine combined in the polymer were as follows:

| Example | Pounds of Butyl Rubber | Gallons of Solvent | Ounces of Chlorine | Percent Chlorine Added | Percent Chlorine Combined in the Polymer |
|---|---|---|---|---|---|
| I | 25 | 30 | 12 | 3.0 | 1.5 |
| II | 29 | 35 | 14 | 3.0 | 1.4 |

The resulting water-washed solutions containing the chlorinated rubbery butyl products of Examples I and II were then each recovered by injecting the dissolved chlorinated polymers into agitated aqueous solutions each containing a commercial wetting agent of the aliphatic poly oxyethylene ether type (Sterox A.J.) in an amount of 64 cc. per 100 pounds of rubber as a dispersing aid and 1 pound of zinc stearate per 100 pounds of rubber, the hot agitated aqueous solutions being employed in an amount of 500 gallons per 100 pounds of rubber.

The agitated solutions were maintained at a temperature between about 160° and 170° F. (e.g., 165° F.) whereby to flash off the hydrocarbon solvent and form an aqueous slurry of the chlorinated butyl rubbers in water. These slurries were then filtered and the chlorinated butyl rubbers, which were in the form of a wet "crumb," were placed in a Proctor and Schwartz tray drier maintained at 210° F. and dried for 6 hours. The crumb depth on the tray was about ½ inch. The crumbs were completely dried and compacted by milling for eight minutes on a conventional rubber mill having a roll temperature of 250° F.

One hundred parts by weight of the resulting stabilized chlorinated butyl rubber of Example I were then compounded on a two roll commercial rubber mill at a roll temperature of 100° F. with the following.

| Component: | Parts by weight |
|---|---|
| Zinc oxide | 5 |
| Carbon black (SRF) | 50 |
| Stearic acid | 1 |

The compounded, stabilized, chlorinated butyl rubber blend formed was then cured for 60 minutes at 287° F. in order to vulcanize the same. The following physical inspections were noted:

| | Above |
|---|---|
| Tensile strength (p.s.i.) | 1000 |
| Modulus at 300% elongation (p.s.i.) | 500 |
| Elongation at break (percent) | 300 |

The above data show that chlorinated butyl rubber stabilized in accordance with the invention (e.g., in this case, prior to drying and hot milling) cures into a vulcanizate having good stress-strain properties. This vulcanizate, when aged in a mold at 315° F. for 90 hours, was not cracked or crazed, had stress-strain properties of the same order of the unaged vulcanizate and exhibited slightly less swell in cyclohexane than did the unaged material.

Examples III–V

An additional three runs were made chlorinating a commercial rubber corresponding to GR–I–18 butyl rubber dissolved in benzene. The chlorination of solutions of the uncured butyl rubbers was conducted in a 500-gallon glass-lined Pfaudler reactor equipped with an agitator, baffle, submersed stainless steel sparger ring and a conduit leading into the ring.

Gaseous chlorine was continuously added to the butyl rubber solutions over a period of ½ hour at a temperature level of 29° C. and under atmospheric pressure. The chlorine was added to the reactor through the conduit via the sparger ring which, as hereinbefore mentioned, was immersed below the liquid level of the agitated butyl rubber solutions. The chlorination was then terminated and the solutions containing the chlorinated butyl rubber formed were agitated for an additional 10 minutes. The resulting solutions of chlorinated butyl rubber were then water-washed three times to remove dissolved hydrogen chloride. There was then added, to each solution, 0.2 pound per 100 pounds of chlorinated butyl rubber, of a stabilizer (2,6-di-tertiary butyl-4-methyl phenol) in accordance with the present invention; the stabilizer being added as a 10 weight percent solution in benzene.

The absolute amounts of butyl rubber, benzene solvent and gaseous chlorine added, as well as the calculated percent of added chlorine based on polymer and resulting percent of chlorine combined in the polymer were as follows:

| Example | Pounds of Butyl Rubber | Pounds of Benzene Solvent | Pounds of Chlorine | Percent Chlorine Added | Percent Chlorine Combined in the Polymer |
|---|---|---|---|---|---|
| III | 190 | 1,740 | 5.6 | 2.9 | 1.25 |
| IV | 193 | 1,760 | 5.5 | 2.9 | 1.20 |
| V | 167 | 1,530 | 4.9 | 2.9 | 1.30 |

The resulting water-washed solutions containing the stabilized, chlorinated rubbery butyl rubber products "III," "IV" and "V" were then each recovered by injecting the dissolved, chlorinated polymer into an agitated aqueous solution containing a commercial wetting agent of the aliphatic polyoxyethylene ether type (Sterox A. J.) in an amount of 0.6 pound per 100 pounds of chlorinated rubber as a dispersing aid. The solution also contained one pound of zinc stearate (an anti-tack agent) per 100 pounds of chlorinated butyl rubber; the hot aqueous solutions employed each containing 4170 pounds of water per 100 pounds of stabilized, chlorinated butyl rubber. Each agitated solution was maintained at a temperature between about 190° and 210° F. (e.g., 200° F.) whereby to flash off the benzene solvent and form an aqueous slurry of the chlorinated butyl rubber in water. This slurry was then filtered and each chlorinated butyl rubber ("III," "IV" and "V"), which was in the form of a wet "crumb," was placed in a Proctor and Schwartz tray drier maintained at 180° F. (i.e., 82° C.) and dried for ten hours. The crumb depth on the tray was about ½ inch. The crumb was then completely dried and compacted by milling for seven minutes on a conventional rubber mill having a roll temperature of 260° F. (i.e., 127° C.).

One hundred parts by weight of the stabilized, chlorinated butyl rubber copolymers of Examples III, IV and V were compounded on a cold rubber mill into the following formulation:

| Component: | Parts by weight |
|---|---|
| Carbon black (SRF) | 50 |
| Zinc oxide | 5 |
| Stearic acid | 1 |

The resulting stabilized, compounded, chlorinated butyl rubber blends were then cured for 60 minutes at 307° F., physical inspections of at least or above the following being noted:

| Property: | Examples III–V |
|---|---|
| Tensile strength (p.s.i.) | 1000 |
| Modulus at 300% elongation (p.s.i.) | 500 |
| Elongation | 300 |

The above data show that good physical properties are obtained by vulcanizing a stabilized, chlorinated butyl rubber in accordance with the present invention with zinc oxide.

One hundred parts by weight of the chlorinated butyl rubber copolymers of Examples III and IV were compounded on a rubber mill into the following formulation:

| Component: | Parts by weight |
|---|---|
| Carbon black (SRF) | 50 |
| Magnesium oxide | 5 |
| Amine curing agent (hexamethylene diamine) | 2.2 |
| Stearic acid | 1.0 |

The resulting stabilized, compounded chlorinated butyl rubber blends were then cured for 60 minutes at 307° F., physical inspections of at least or above the following being noted:

| Property: | Examples III–IV |
|---|---|
| Tensile strength (p.s.i.) | 1000 |
| Modulus at 300% elongation (p.s.i.) | 500 |
| Elongation (percent) | 300 |

The foregoing data show that good physical properties are obtained by vulcanizing stabilized, chlorinated butyl rubber with an amino compound (e.g., hexamethylene diamine) in the substantial absence of added elemental sulfur or ultra-type accelerators such as derivatives of thiuram or thiocarbamic acid.

Example VI

The stabilized, chlorinated butyl rubber of Example II was compounded in accordance with the present invention on a rubber mill into the following composition containing an additional stabilizer.

| Component: | Parts by weight |
|---|---|
| Chlorinated butyl rubber "II" | 100 |
| Carbon Black (SRF) | 50 |
| Stabilizer, i.e. 2,2'-methylene-bis (4-methyl-6-tertiary butyl phenol) | 1 |
| Stearic acid | 0.5 |
| Zinc oxide | 5.0 |

The resulting stabilized, chlorinated butyl rubber was then cured for 60 minutes at 300° F., the following physical inspections being noted:

| Property: | |
|---|---|
| Tensile strength (p.s.i.) | 1600 |
| Elongation (percent) | 500 |
| Modulus at 300% elongation (p.s.i.) | 660 |

The above data show that the chlorinated butyl rubber stabilized in accordance with the present invention, upon vulcanization, exhibits desirable stress-strain properties.

A sample of the above vulcanizate was then placed in a circulating air oven having a temperature of 315° F. (157° C.) In the procedure employed, strips of the stabilized, chlorinated butyl rubber vulcanizate were suspended in the oven for up to 67 hours exposure. After this thermal aging, the equilibrium swell at 25° C. of each sample was determined in cyclohexane. Partial failure in this test appears when the aged sample becomes appreciably soluble in the cyclohexane solvent. The results were as follows:

| Time of exposure (hours): | Percent volume swell in cyclohexane |
|---|---|
| 0 | 430 |
| 2 | 375 |
| 4 | 380 |
| 8 | 350 |
| 16 | 350 |
| 24 | 330 |
| 67 | 385 |

The above data show that chlorinated butyl rubber, stabilized by an organic compound in accordance with the present invention, exhibits excellent thermal aging properties. More particularly, the volume swell in cyclohexane of the vulcanizate, stabilized in accordance with the present invention, aged 67 hours, was of the same order of that of the unaged material; namely, the swell in cyclohexane was 385% by volume for the aged material, compared to 430% by volume swell for the unaged material. This shows that no degradation of the vulcanizate, stabilized in accordance with the present invention, has occurred. If the volume swell in cyclohexane had substantially increased to a high level, the vulcanizate would have been badly degraded. Upon further testing, it was determined that the aged vulcanizate, stabilized in accordance with the present invention, was also not embrittled, nor did it crack upon flexing.

GR–S or natural rubber, when treated and thermally aged as above, would be substantially unvulcanized and the resulting material would become badly embrittled and crack upon flexing.

Likewise, as hereinbefore mentioned, unmodified butyl rubber does not respond to stabilization. In order to show this effect, a sample of a commercial butyl rubber corresponding to GR–I–17 rubber, having a Mooney viscosity at 212° F. for 8 minutes of 67, a mole percent unsaturation by the drastic iodine-mercuric acetate method of 1.7 and a viscosity average molecular weight of 435,000 (sample "a") was compounded into the following formulation:

| Component: | Parts by weight |
|---|---|
| Unmodified butyl rubber (GR–I–17) | 100 |
| Carbon black (SRF) | 50 |
| Sulfur | 2 |
| Zinc oxide | 5 |
| Tellurium diethyl dithiocarbamate | 1 |
| Stearic acid | 1 |

An additional sample (sample "b") was compounded as above and additionally with one part by weight of the stabilizer 2,2'-methylene-bis(4-methyl - 6 - tertiary butyl phenol). Each sample was then cured for 90 minutes at a temperature of 287° F. They were then aged in a circulating air oven at a temperature of 315° F. for various periods of time and the per cent volume swell of the vulcanizates then determined generally as described hereinbefore. The results were as follows:

| Time of Exposure (hours) | Percent Volume Swell in Cyclohexane | |
|---|---|---|
| | Sample "a" | Sample "b" |
| 0 | 325 | 330 |
| 2 | 345 | 350 |
| 4 | 440 | 450 |
| 8 | 580 | 555 |
| 16 | 740 | 720 |
| 24 | 780 | 780 |

The above data show that the stabilizer, 2,2'-methylene-bis (4-methyl-6-tertiary butyl phenol), was ineffective in preventing thermal degradation of unmodified butyl rubber, whereas it has been demonstrated hereinbefore that this same stabilizer effectively prevents thermal degradation of chlorinated butyl rubber for 67 hours.

*Example VII*

One hundred parts by weight of stabilized, chlorinated butyl rubber "II" were compounded into the following formulations:

| Component | Parts by Weight | |
|---|---|---|
| | Sample "c" | Sample "d" |
| Carbon Black (SRF) | 50 | 50 |
| Magnesium Oxide | 5 | 5 |
| Amine curing agent (i.e., hexamethylene diamine) | 1.5 | 2.0 |
| Processing aid (Stearic acid) | 0.5 | 1.0 |
| Stabilizer, i.e., 2 - 2' - methylene - bis (4-methyl-6-tertiary butyl phenol) | 1.0 | 1.0 |

The resulting compounded, stabilized, chlorinated butyl rubbers were then cured for 60 minutes at 300° F., the following physical inspections being noted:

| Property | Sample "c" | Sample "d" |
|---|---|---|
| Tensile Strength (p.s.i.) | 1,600 | 1,750 |
| Elongation (percent) | 430 | 490 |
| Modulus at 300% Elong. (p.s.i.) | 920 | 870 |

Strips of the above vulcanizates were then aged in a circulating air oven at 315° F. and their volume swell in cyclohexane noted generally in accordance with the procedure employed in Example VI. The results were as follows:

| Time of Exposure (hours) | Percent Volume Swell in Cyclohexane | |
|---|---|---|
| | Sample "c" | Sample "d" |
| 0 | 400 | 350 |
| 2 | 290 | 270 |
| 4 | 275 | 255 |
| 8 | 280 | 250 |
| 16 | 295 | 260 |

The above data show that chlorinated butyl rubber, stabilized in accordance with the present invention, exhibits excellent physical and thermal aging properties. The stabilized, chlorinated butyl rubber vulcanizates also did not become appreciably soluble in the cyclohexane and the vulcanizates were not embrittled or cracked upon flexing. GR–S or natural rubber when stabilized, compounded, treated, and thermally aged as above, would become badly embrittled and would crack upon flexing.

*Examples VIII–X*

The same general procedure as employed in Example VI was repeated except that the stabilized, chlorinated butyl rubber employed was chlorinated butyl rubber "IV" and the amount of added stabilizer, 2,2'-methylene-bis(4-methyl-6-tertiary butyl phenol) was as follows:

| Component | Parts by Weight | | |
|---|---|---|---|
| | VIII | IX | X |
| Stabilizer | 1 | 2 | 3 |

The stabilized, compounded, chlorinated butyl rubber stocks of each example were then cured for 60 minutes at 300° F., and aged in a circulating air oven at 311° F. (155° C.). At various times, samples were removed and the stress-strain properties determined on a Scott tester. The results were as follows:

| Time of Exposure (hours) | Tensile Strength (p.s.i.) | | | Elongation (Percent) | | | Modulus at 300% Elong. (p.s.i.) | | |
|---|---|---|---|---|---|---|---|---|---|
| | VIII | IX | X | VIII | IX | X | VIII | IX | X |
| 0 | 1,800 | 1,700 | 1,750 | 500 | 500 | 540 | 900 | 860 | 790 |
| 2 | 1,550 | 1,650 | 1,625 | 475 | 515 | 540 | 960 | 810 | 800 |
| 4 | 1,650 | 1,550 | 1,500 | 500 | 500 | 500 | 1,000 | 870 | 825 |
| 8 | 1,525 | 1,405 | 1,375 | 455 | 450 | 435 | 1,010 | 900 | 900 |
| 16 | 1,175 | 1,200 | 1,190 | 335 | 330 | 330 | 1,050 | 1,100 | 1,075 |
| 24 | 1,050 | 1,075 | 1,100 | 320 | 310 | 300 | 1,000 | 990 | 1,100 |

The above data show that after 24 hours of heat aging in a circulating air oven at 311° F., the stress-strain properties of the stabilized, chlorinated butyl rubber vulcanizates were still satisfactory. GR–S or natural rubber, when stabilized, compounded, treated and thermally aged as above, would become badly embrittled, cracked upon flexing and badly degraded.

*Examples XI–XII*

A master batch, in parts by weight, was prepared of the recipe: stabilized, chlorinated butyl rubber "V", 100; SRF carbon black, 50; zinc oxide, 5; and stearic acid, 0.5. To portions of this master batch were added one weight percent based on polymer of various stabilizers. After curing at 300° F. for 60 minutes, samples were placed in a circulating air oven maintained at a temperature level of 297° F. (147° C.) for various lengths of time and their volume swell in cyclohexane then determined. The results were as follows:

| Example | XI | XII |
|---|---|---|
| Stabilizer | 2,2'-methylene bis(4-methyl-6-tertiary butyl phenol). | N-lauroyl-p-amino phenol. |
| Tensile Strength (p.s.i.) | 1,370 | 1,800. |
| Elongation (Percent) | 490 | 510. |
| Modulus at 300% Elongation. | 685 | 925. |

| Time of Exposure (hours) | Percent Volume Swell in Cyclohexane | |
|---|---|---|
| 0 | 460 | 395 |
| 2 | 430 | 390 |
| 4 | 410 | 395 |
| 8 | 390 | 395 |
| 16 | 375 | 395 |
| 24 | 370 | 395 |
| 48 | 370 | 390 |
| 72 | 395 | 395 |
| 96 | 400 | 405 |
| 120 | 425 | 440 |
| | | 460 |

The above data show that chlorinated butyl rubber, stabilized by organic compounds in accordance with the present invention, exhibits excellent thermal aging properties. Also, the stabilized, chlorinated butyl rubber vulcanizates did not become appreciably soluble in the cyclohexane and were not embrittled or cracked upon flexing.

Unstabilized, chlorinated butyl rubber, although superior to unmodified butyl rubber or a brominated butyl rubber, would only heat age satisfactorily for less than half of the foregoing times.

*Example XIII*

The same general procedure as in Examples XI–XII was repeated except that 2,6-di-tertiary butyl-4-methyl phenol was used as the stabilizer. The results, upon heat aging at 297° F., were as follows:

Tensile strength (p.s.i.) _____ 1360
Elongation (percent) _____ 500
Modulus @ 300% elong. (p.s.i.) _____ 600

| Time of Exposure (hours): | Percent volume swell in cyclohexane |
|---|---|
| 0 | 470 |
| 2 | 420 |
| 4 | 385 |
| 8 | 385 |
| 16 | 390 |
| 24 | 380 |
| 48 | 410 |
| 72 | 470 |
| 96 | 475 |

The above data show that chlorinated butyl rubber, stabilized in accordance with the present invention, exhibits outstanding thermal againg properties. More particularly, the percent swell in cyclohexane is substantially unchanged although the vulcanizate was heat aged at 297° F. for 96 hours. Also, the stabilized, chlorinated butyl rubber vulcanizate did not become appreciably soluble in the cyclohexane and was not embrittled or cracked upon flexing.

Unstabilized, chlorinated butyl rubber, although superior to unmodified butyl rubber and brominated butyl rubber, will only heat age satisfactorily for about half of the foregoing exposure time. GR–S or natural rubber, when compounded, treated, and thermally aged as above, would become badly embrittled and cracked upon flexing.

*Example XIV*

The following data demonstrates the fact that chlorinated butyl rubber, stabilized in accordance with the invention with organic stabilizing compounds when cured in the absence of elemental sulfur and ultra-accelerators (such as derivatives of thiuram and thiocarbamic acid) but in the presence of a small amount of phenol dialcohol resins, yields thermally resistant vulcanizates having a combination of high tensile strength and modulus. In this experiment, 100 parts by weight of the stabilized, chlorinated butyl rubber of Example III (i.e., containing 1.25 weight percent chlorine) were compounded on a rubber mill into the following composition:

Component: Parts by weight
Carbon black (SRF) _____ 60
Zinc oxide _____ 5
2,6-dimethylol-4-octyl phenol resin (produced at 125° C.) _____ 5
Stabilizer, i.e. 2,2'-methylene-bis(4-methyl-6-tertiary butyl phenol) _____ 0.5
Processing aid (e.g., stearic acid) _____ 1.0

The resulting, stabilized, chlorinated butyl rubber-phenol dialcohol resin-containing compounded stock formed was then cured for 40 minutes at 307° F., the following physical inspections being noted:

Property:
Tensile strength (p.s.i.) _____ 2800
Modulus at 100% elong. (p.s.i.) _____ 500
Modulus at 200% elong. (p.s.i.) _____ 1400
Modulus at 300% elong. (p.s.i.) _____ 2600
Elongation, percent _____ 325

A sample of the above vulcanizate was then placed in a circulating air oven maintained at 312° F. (155° C.)

for 72 hours and the volume swell in cyclohexane determined to be substantially the same as for the unaged vulcanizate.

Figure 1:
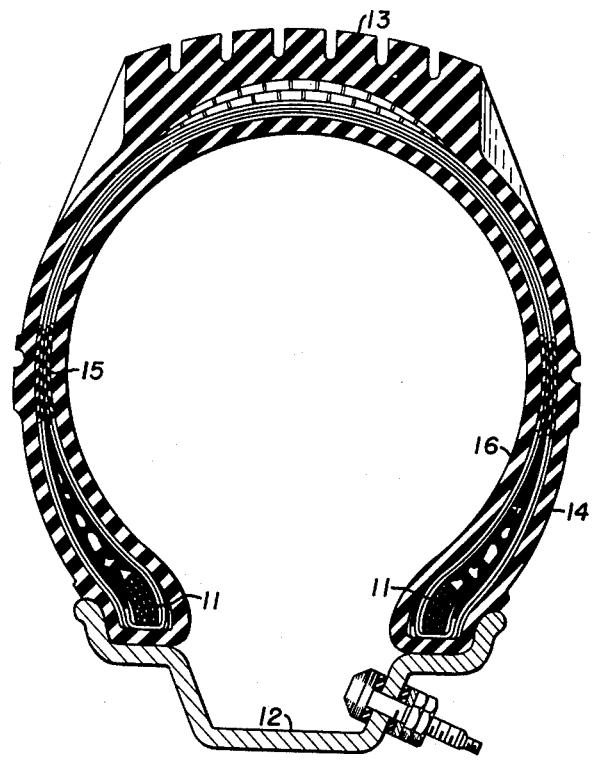
Figure 1 is a vertical section of a pneumatic tubeless tire employing therein a chlorinated copolymer which has been stabilized by an aromatic or heterocyclic organic compound in accordance with the present invention.

One particularly advantageous use for the stabilized, chlorine-containing isoolefin-multiolefin rubbery copolymers such as butyl rubber of the present invention is in pneumatic tires of either the inner tube-containing variety or in tubeless type tires. Referring now to the drawings, Figure 1 depicts a pnueatic tubeless tire which comprises a hollow toroidal type member which is substantially U-shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire, inside of which are a plurality of bead wires, adhesively embedded and molded in a rubber. The outer surface of the bead portion is advantageously formed into an air-sealing means to aid in adhesion to rim 12 when the tire is inflated.

Typical air sealing means may comprise a layer of rubber disposed on the outer surfaces of the bead portions. This layer will generally vary in thickness between about 0.02 to 0.5 inch and comprise a vulcanized rubber or rubbers having a relatively low compression or permanent set. Alternatively, the outer surfaces of the bead portions may contain a plurality of ribs or, if these surfaces are smooth, the tire rim may be roughened (for example by sand-blasting) and/or ribbed circumferentially or both circumferentially and radially in those areas where the outer surfaces of the tire bead portions contact the rim.

In any of the foregoing types of sealing means, a gumbo, dope or cement comprising a soft, tacky, rubbery composition may be applied to the outer surfaces of the bead portions and/or the tire rim prior to mounting the tire. In any case, the air-sealing means advantageously contain the modified copolymers in accordance with the invention; the particular structural details of the tire or rim surfaces not constituting a part of the present invention. The outer surface of the tire also includes tread 13 and sidewalls 14. The open portion of the horseshoe-shaped tire faces that portion of the inner curcumference of the tire which is adjacent the said tread area 13 of the tire.

The remaining construction of the tire may vary according to the conventional fabrication, but in general, the tire is a multi-layered type of structure with an outer layer as hereinbefore mentioned.

The layer next adjacent the outer layer comprises a carcass 15 which includes a rubber having incorporated therein a fabric composed of a plurality of cotton, rayon, nylon, or steel cords. The tire also includes an inner lining 16, advantageously made from rubber; e.g.; a chlorine-containing isooelfin-multiolefin rubbery copolymer stabilized in accordance with the present invention, which has been at least partially vulcanized or covulcanized with other rubbery polymers for about one to 300 minutes at temperatures between about 100° and 400° F. This inner lining must be substantially impermeable to air. The above multi-layers, at least 3 in number, are conventionally bonded or otherwise adhered together, for example, by cementing and/or especially by vulcanizing to form a tire of a unitary structure.

The compositions comprising the stabilized, chlorinated isoolefin-multiolefin-containing copolymers of the present invention may be employed generally throughout the tire. For example, as abovementioned, the inner lining 16 may comprise such a stabilized chlorine-containing modified rubbery copolymer. Alternatively, inner lining 16 may comprise ordinary butyl rubber which has been bonded to carcass 15 by an interposed tie ply of a stabilized, chlorinated isoolefin-multiolefin-containing copolymer which has been at least partially vulcanized or covulcanized with other rubbery polymers in the presence of polyvalent metal oxides such as zinc oxide and/or primary or polyfunctional amines and/or sulfur-containing compounds and/or quinoid compounds such as paraquinone dioxime or paradinitrosobenzene and preferably also containing per 100 parts by weight of stabilized, chlorinated isoolefin-multiolefin-containing copolymer, about 5 to 150 parts by weight of a filler such as a carbon black and/or a mineral filler such as clay, silica, alumina, talc, or the like. Such an interposed tie ply facilitates the inclusion of highly unsaturated rubber such as natural rubber, GR–S rubber (rubbery diene-styrene copolymers) Buna-N rubber (rubbery diene-nitrile rubber), neoprene rubber (i.e., polychloro alkadiene rubber), mixtures thereof, etc., in the carcass.

The other layers of the tire such as the carcass layer and/or the outer layer (including the tread area, sidewalls, outer bead portions, etc.) may also comprise stabilized, chlorinated isoolefin-multiolefin-containing copolymers, particularly stabilized, chlorinated butyl rubber, in accordance with the present invention. Vulcanization of the carcass, plies (if any), sidewalls and tread area is advantageously accomplished by heating the same for times of between about 1 to 100, advantageously about 3 to 80, preferably about 10 to 60 minutes at temperatures between about 250° and 450° F., preferably between about 275° and 400° F. These layers may also contain, in addition to stabilized, chlorinated isoolefin-multiolefin-containing copolymers, other rubbery polymers covulcanized therewith.

The tubeless tire may also contain, in at least the tread area 13, an oil-extended high molecular weight (e.g., viscosity average molecular weight of about 900,000 to about 2,000,000) butyl rubber and/or stabilized chlorinated butyl rubber which has been bonded to either a highly saturated or unsaturated rubber or mixture of rubbers in carcass 15 by an interposed tie ply of a stabilized, chlorinated isoolefin-multiolefin-containing copolymer, preferably stabilized, chlorinated butyl rubber, in accordance with the present invention, which has been advantageously substantially completely vulcanized, or covulcanized with other rubbery polymers.

Figure 2:
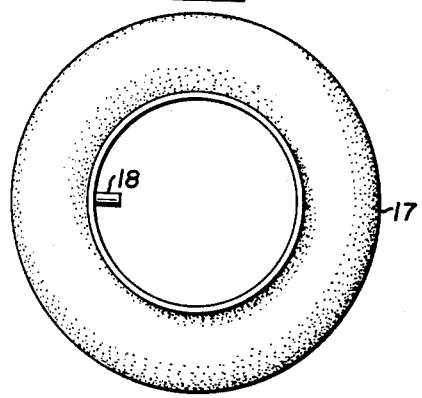
Figure 2 is a view in side elevation of a tire casing curing bag, formed of a material comprising a stabilized, chlorinated copolymer in accordance with the present invention.

Another advantageous use for the stabilized, chlorinated isoolefin-multiolefin-containing copolymers, particularly stabilized, chlorinated butyl rubber of the present invention, is in the manufacture of curing bags, particularly tire curing bags. Figure 2 of the accompanying drawings illustrates a tire curing bag made of such a stabilized, chlorinated isoolefin-multiolefin-containing copolymer, in accordance with the present invention, which has been advantageously compounded into the following recipe or its equivalent:

| Component | Parts by weight | |
| --- | --- | --- |
| | Typical Range | Preferred Range |
| Stabilized chlorinated isoolefin-multiolefin copolymer | 100 | 100 |
| Additional stabilizer | 0.5–20.0 | 1–10 |
| Phenol dialcohol resin (i.e., 2,6-dimethylol-4-cyclohexyl phenol resin) | 0.1–20.0 | 0.5–15.0 |
| Zinc oxide | 2–20 | 5–15 |
| Filler [1] | 30–80 | 40–60 |
| Die anti-tack agent (e.g., stearic acid) | 0–5 | 0.5–2.0 |
| Phenol dialcohol resin | 0–20 | 2–15 |

[1] The filler advantageously comprises any suitable non-oxy carbon black such as furnace or thermal blacks and/or mineral fillers such as clays, talc, alumina, silica, diatomaceous earth, etc.

The above compounded stock is shaped into the form of curing bag 17 in accordance with conventional practice and is then cured in a mold at temperatures between about 280° and 350° F. for a period of time ranging between about 10 minutes and 2 hours, the lower the temperature the longer the curing time and vice versa. Referring again to Figure 2, tire curing bag 17 is of an annular toroidal form having an external shape corresponding approximately to the interior contour of the pneumatic tire casing or inner liner to be cured thereon, and is equipped with the usual connecting valve 18 by means of which a heated fluid under pressure, such as hot water and/or steam is introduced into the interior cavity of the bag during the vulcanization of the tire. The tire curing bag is thereby expanded, causing the tire to conform closely to the surfaces of the mold cavity in which the tire is vulcanized. A tire curing bag generally has a wall thickness between about 0.5 to 3.0, preferably 1.0 to 2.5 inches. Such a curing bag, produced in accordance with the present invention, is superior to conventional curing bags in its resistance to deteriorating influences.

Figure 3:
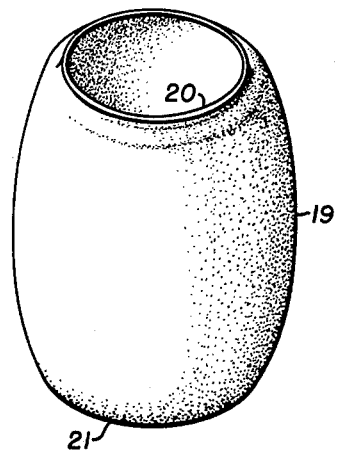
Figure 3 is a perspective view of a tire casing curing diaphragm or bladder as provided in the structure of a Bag-O-Matic press and containing therein a stabilized, chlorinated copolymer in accordance with the present invention.

Another advantageous use for the stabilized, chlorinated isoolefin-multiolefin-containing rubbery copolymers of the present invention is in making tire casing curing diaphragms or bladders in Bag-O-Matic presses. Figure 3 shows such a hollow cylindrical curing bladder or diaphragm 19 useful in a Bag-O-Matic tire press. The top 20 and bottom 21 of the diaphragm are sealed when in position on the press by a combination of bead and clamping rings (not shown) which also form the bead area of the tire mold. A Bag-O-Matic tire press is illustrated and described on pages 314 and 318 to 319 in "Machinery and Equipment for Rubber and Plastics," volume I; "Primary Machinery and Equipment" (1952, compiled by R. G. Seaman and A. M. Merrill) to which reference may be had for further details. The compounding of stabilized chlorinated butyl rubber for use in vulcanized curing diaphragms is essentially the same as for tire curing bags outlined above.

Other embodiments of the present invention comprise the use of stabilized, chlorinated isoolefin-multiolefin-containing copolymers, particularly chlorinated butyl rubber in conveyor belting and steam hose. The excellent heat-aging resistance properties of stabilized, chlorinated isoolefin-multiolefin-rubbery copolymers, which have superior heat-aging resistance properties compared to vulcanizates of unhalogenated isoolefin-multiolefin-containing copolymers (which cannot be stabilized effectively), makes the stabilized, chlorinated copolymers of the present invention particularly adaptable for use in steam hose and conveyor belting where, in each instance, the transport of hot materials is involved.

Figure 4 shows a conveyor belt 22 containing a stabilized, chlorinated rubbery isoolefin-multiolefin-containing copolymer in accordance with the present invention, said belt being in position on drive roller 23, idle roller 24 and idle support rollers 25. The belt may consist wholly of a stabilized, chlorinated isoolefin-multiolefin-containing rubbery copolymer, particularly stabilized, chlorinated butyl rubber, in accordance with the present invention, but preferably contains embedded therein a fabric 26 composed of a plurality of plies of cotton, rayon, nylon or steel filaments, cords or threads. A suitable formulation for compounding stabilized, chlorinated isoolefin-multiolefin-containing copolymers for use in either conveyor belting or in steam hose is as follows:

| Component | Parts by Weight | |
|---|---|---|
| | Typical Range | Preferred Range |
| Stabilized, chlorinated isoolefin-multiolefin copolymer | 100 | 100 |
| Additional stabilizer | 0.1–20.0 | 0.5–10.0 |
| Zinc oxide | 2–20 | 5–15 |
| Phenol dialcohol resin (e.g., 2,6-dimethyl-4-phenyl phenol resin) | 0–15.0 | 1–10.0 |
| Filler [1] | 40–120 | 50–80 |
| Die anti-tack agent (e.g., stearic acid) | 0–5 | 0.5–2.0 |
| Phenolic-aldehyde resin | 0–20 | 2–15 |

[1] The filler may comprise oxy or non-oxy carbon blacks such as channel, furnace or thermal blacks and/or mineral fillers such as clays, talc, alumina, silica, silica-alumina, diatomaceous earth, etc.

Figure 5 shows a central longitudinal section broken away of a flexible rubber steam hose 27 produced in accordance with the present invention. Again, as in the case of the conveyor belt, the steam hose may consist wholly of stabilized, chlorinated butyl rubber, but preferably contains embedded therein a cotton, rayon, nylon or steel fabric 28.

The expression "layer," as employed in the claims, is intended to include plies, cement layers, the tread base, and liners as well as such layers as the carcass, sidewalls, tread area, etc. of tires.

The compositions comprising stabilized, chlorinated isoolefin-multiolefin copolymers, particularly stabilized, chlorinated butyl rubber, in accordance with the present invention, may be employed alone or in admixture with other rubbers for a wide variety of applications other than those mentioned hereinbefore such as in electrical insulation, inner tubes, blown sponge rubber, car window channel strips, proofed goods and other applications where unmodified butyl rubber or certain chloroalkadiene rubbery homopolymers or copolymers have utility.

Resort may be had to various modifications and variations of the foregoing disclosed specific embodiments and examples without departing from the spirit of the invention or the scope of the appended claims.

What is claimed is:

1. A composition consisting essentially of a major proportion of the reaction product at a temperature of above 0° C. to about 100° C. of a rubbery copolymer of about 85 to 99.5 weight percent of a $C_4$ to $C_{10}$ isomonoolefin and about 0.5 to 15 weight percent of a $C_4$ to $C_{14}$ diolefin with a chlorinating agent; said reaction product having a Staudinger molecular weight of about 15,000 to 200,000, a mole percent unsaturation of 0.2 to 20.0, and containing at least about 0.5 weight percent combined chlorine on a basis of the total weight of copolymer but not more than about 1 combined atom of chlorine per double bond in said copolymer and 0.5 to 20 weight percent of a stabilizer selected from the group consisting of N-lauryl-p-amino phenol; 2,2'-methylene-bis(4-methyl - 6 - tertiary butyl phenol), and 2,6-ditertiary butyl-4-methyl-phenol.

2. A composition consisting essentially of a rubbery copolymer having a Staudinger molecular weight of between about 30,000 and 150,000, a mole percent unsaturation of 0.2 to 20.0 and containing atoms of hydrogen, carbon and chlorine and further containing in its structure about 85 to 99.5 weight percent of hydrocarbon units derived by the copolymerization of an isomonoolefin containing about 4 to 10 carbon atoms with about 0.5 to 15 weight percent of a diolefin containing about 4 to 14 carbon atoms; said copolymer containing at least about 0.5 weight percent chlorine combined therein at a temperature level of above about 0° C. to about 100° C. but not more than about X weight percent combined chlorine wherein:

$$X = \frac{35.46L}{(100-L)M_1 + L(M_2+35.46)} \times 100$$

wherein:

$L$ = mole percent of the diolefin in the copolymer
$M_1$ = molecular weight of the isomonoolefin
$M_2$ = molecular weight of the diolefin
35.46 = atomic weight of chlorine;

said copolymer being in composition with about 0.1 to 20 weight percent of a stabilizer selected from the group consisting of N-lauryl-p-amino phenol; 2,2'-methylene-bis(4-methyl-6-tertiary butyl phenol), and 2,6-ditertiary butyl-4-methyl phenol.

3. A composition according to claim 2 in which the stabilizer is N-lauryl-p-amino phenol.

4. A composition according to claim 2 in which the stabilizer is 2,2'-methylene-bis (4-methyl-6-tertiary butyl phenol).

5. A composition according to claim 2 in which the stabilizer is 2,6-ditertiary butyl-4-methyl phenol.

6. An improved process for vulcanizing a butyl rubber copolymer of 85 to 99.5 weight percent of a $C_4$ to $C_8$ isomonoolefin with 0.5 to 15 weight percent of a $C_4$ to $C_{14}$ diolefin which consists essentially of dissolving the unvulcanized copolymer in a solvent, chlorinating the copolymer at a temperature level of above 0° C. to about 100° C. to contain at least about 0.5 weight percent combined chlorine but not more than about 1 atom of combined chlorine per double bond in the copolymer, the chlorinated copolymer formed having a Staudinger molecular weight of between about 15,000 and 200,000, and a mole percent unsaturation of 0.2 to 20.0, recovering the chlorinated copolymer and adding thereto about 0.1 to 20 weight percent of a stabilizer selected from the group consisting of N-lauryl-p-amino phenol; 2,2'-methylene-bis(4-methyl-6-tertiary butyl phenol), and 2,6-ditertiary butyl-4-methyl phenol; and curing the resulting mixture at a temperature level of between about 250° and 400° F. in the presence of about 2 to 30 parts by weight of a basic metal compound selected from the group consisting of group II metal oxides, group II metal carboxylates and mixtures thereof and about 0 to 20 parts by weight of an amino compound selected from the group consisting of primary amines, diamines, and mixtures thereof, for about 1 to 200 minutes.

References Cited in the file of this patent
UNITED STATES PATENTS

| | | |
|---|---|---|
| 2,698,041 | Morrissey et al. | Dec. 28, 1954 |
| 2,720,479 | Crawford et al. | Oct. 11, 1955 |
| 2,725,373 | Reynolds | Nov. 29, 1955 |
| 2,732,354 | Morrissey et al. | Jan. 24, 1956 |
| 2,870,106 | Ridgeway et al. | Jan. 20, 1959 |